United States Patent
Ikeda et al.

(10) Patent No.: US 6,522,949 B1
(45) Date of Patent: Feb. 18, 2003

(54) ROBOT CONTROLLER

(75) Inventors: Tatsuya Ikeda, Kawanishi (JP); Kazuhiko Ochiai, Toyonaka (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 0 days.

(21) Appl. No.: 09/856,846

(22) PCT Filed: Sep. 26, 2000

(86) PCT No.: PCT/JP00/06595
§ 371 (c)(1),
(2), (4) Date: Sep. 19, 2001

(87) PCT Pub. No.: WO01/23149
PCT Pub. Date: Apr. 5, 2001

(30) Foreign Application Priority Data

Sep. 27, 1999 (JP) .......................................... 11-272400

(51) Int. Cl.⁷ .............................................. G06F 19/00
(52) U.S. Cl. ................ 700/245; 700/246; 700/247; 700/251; 700/254; 700/257; 700/262; 700/263; 219/125.1; 219/121.63; 219/121.64; 714/15; 714/23; 714/24; 318/573; 701/23; 901/3
(58) Field of Search .............................. 700/245, 246, 700/247, 251, 254, 257, 262; 318/573; 219/125.1, 121.63, 121.64; 361/680; 714/15, 24; 701/23; 901/3

(56) References Cited

U.S. PATENT DOCUMENTS

| | | | | |
|---|---|---|---|---|
| 4,179,602 A | * | 12/1979 | Maruyama et al. | 180/211 |
| 4,553,077 A | * | 11/1985 | Brantmark et al. | 318/568.12 |
| 4,888,708 A | * | 12/1989 | Brantmark et al. | 706/13 |
| 5,650,077 A | * | 7/1997 | Zinke | 340/436 |
| 6,134,102 A | * | 10/2000 | Worn et al. | 250/253 |
| 6,356,806 B1 | * | 3/2002 | Grob et al. | 700/259 |
| 6,362,813 B1 | * | 3/2002 | Worn et al. | 345/169 |

FOREIGN PATENT DOCUMENTS

| | | |
|---|---|---|
| JP | 4-359302 | 12/1992 |
| JP | 6-222829 | 8/1994 |
| JP | 8-171409 | 7/1996 |
| JP | 8-267381 | 10/1996 |
| JP | 11-99492 | 4/1999 |

OTHER PUBLICATIONS

Fanuc Ltd., Fanuc i pendant, 1997–2002, Internet, p. 1.*
Yamaha Scara Robot YK–X series, RCX40, no date, internet, pp. 1–10.*
Palm et al., Visually based control, 1998, (International organisation for standardisation), Internet, pp. 1–16.*
Sony trading international corporation, Screw–Fastening Robot (pick & place type), 1997–2000, Internet, pp. 1–3.*

* cited by examiner

Primary Examiner—William A. Cuchlinski, Jr.
Assistant Examiner—McDieunel Marc
(74) Attorney, Agent, or Firm—Wenderoth, Lind & Ponack, L.L.P.

(57) ABSTRACT

When a position deviation of teaching point of a robot manipulator is detected during continuous operation of a robot system, device for correcting the teaching point without stopping continuous operation of the robot system is provided, thereby presenting device for operating the robot system efficiently without having effects on productivity of the production line. Having a changeover unit for changing over modes by selecting from an input mode for entering teaching points, an operation mode for operating according to the teaching points, and an in-process correction mode for correcting the teaching points stored in the storage unit according to the data from the input unit during operation of the robot manipulator, the mode is changed over to the in process correction mode by the changeover unit, the data for correcting the teaching point is entered from the input unit, and the control unit corrects and processes according to the entered data.

7 Claims, 9 Drawing Sheets

ROBOT CONTROLLER

TECHNICAL FIELD

The present invention relates to a robot control apparatus correcting data taught to a robot.

BACKGROUND OF THE INVENTION

Hitherto, as the teaching method in an industrial robot system (RS) comprising a robot manipulator (RM) and a robot control apparatus, the teaching playback method has been in the mainstream. In the teaching playback method, the operator operates the RM, and teaches positions of plural points where the RM works. The teaching program to operate continuously at the plural teaching points thus taught is registered. According to the teaching program, the RM is operated and works. The RM either passes through or stops temporarily at the teaching points. At the teaching point where the RM stops temporarily, for example, the torch switch of the welding power supply unit can be turned on. In this case, the teaching point where the RM stops temporarily is also an operation point.

It is a feature of the teaching playback method that the RM passes through the teaching point taught by the operator. However, the work installation position as the object of job, or the position taught by the operator can be deviated.

There are two types of position deviation, that is, the position deviation is significant, and the teaching point must be corrected, or the position deviation is not so significant, but it is better to correct the teaching point.

Actually, however, when the operator operates the RM and teaches positions of plural points where the RM works, the former case hardly occurs. Most position deviations are the latter case.

In the conventional RS, when a teaching point having such position deviation is found, the operator stops the continuous operation of the RS once, and tries to teach a better position again.

Thus, in the conventional RS, temporary stop of the RS is required. As a result, the productivity of the production line incorporating the RS decreases, while other production lines suffer from effects of time delay. Besides, the operator spent extra time for teaching again.

SUMMARY OF THE INVENTION

The present invention is intended to solve these problems. Accordingly, the invention comprises means for correcting the coordinates of teaching point without stopping continuous operation of the RS. By this means of correcting coordinates of teaching points, the robot control apparatus of the invention is capable of working with the RS efficiently without lowering the productivity of the production line.

To solve the problems, the robot control apparatus composed of a control unit and an input unit of the invention comprises:

a. the input unit connected to the control unit for entering teaching points of RM, b. a storage unit for storing coordinates of teaching points entered from the input unit, c. the control unit for transmitting the data for operating the RM to the RM, according to the data of teaching points stored in the storage unit, and d. a changeover unit, provided in the input unit, for changing over modes, that is, an input mode for entering teaching points, an operation mode for operating according to the teaching points, and an in-process correction mode for correcting the teaching point stored in the storage unit according to the data from the input unit during operation of the RS.

During continuous operation of the RS in the operation mode, when deviated teaching points found, the operator switches the changeover unit to the in-process correction mode. In the in-process correction mode, the operator enters data for correcting the teaching point from the input unit. According to the entered data, the control unit processes correction. By this correction, the RM is operated according to the corrected data of teaching point. While the operator is correcting in the in-process correction mode, the RM continues to work without stopping the continuous operation. The RS having the robot control apparatus of the invention operates as described above.

DESCRIPTION OF THE PREFERRED EMBODIMENTS

Figure 1:
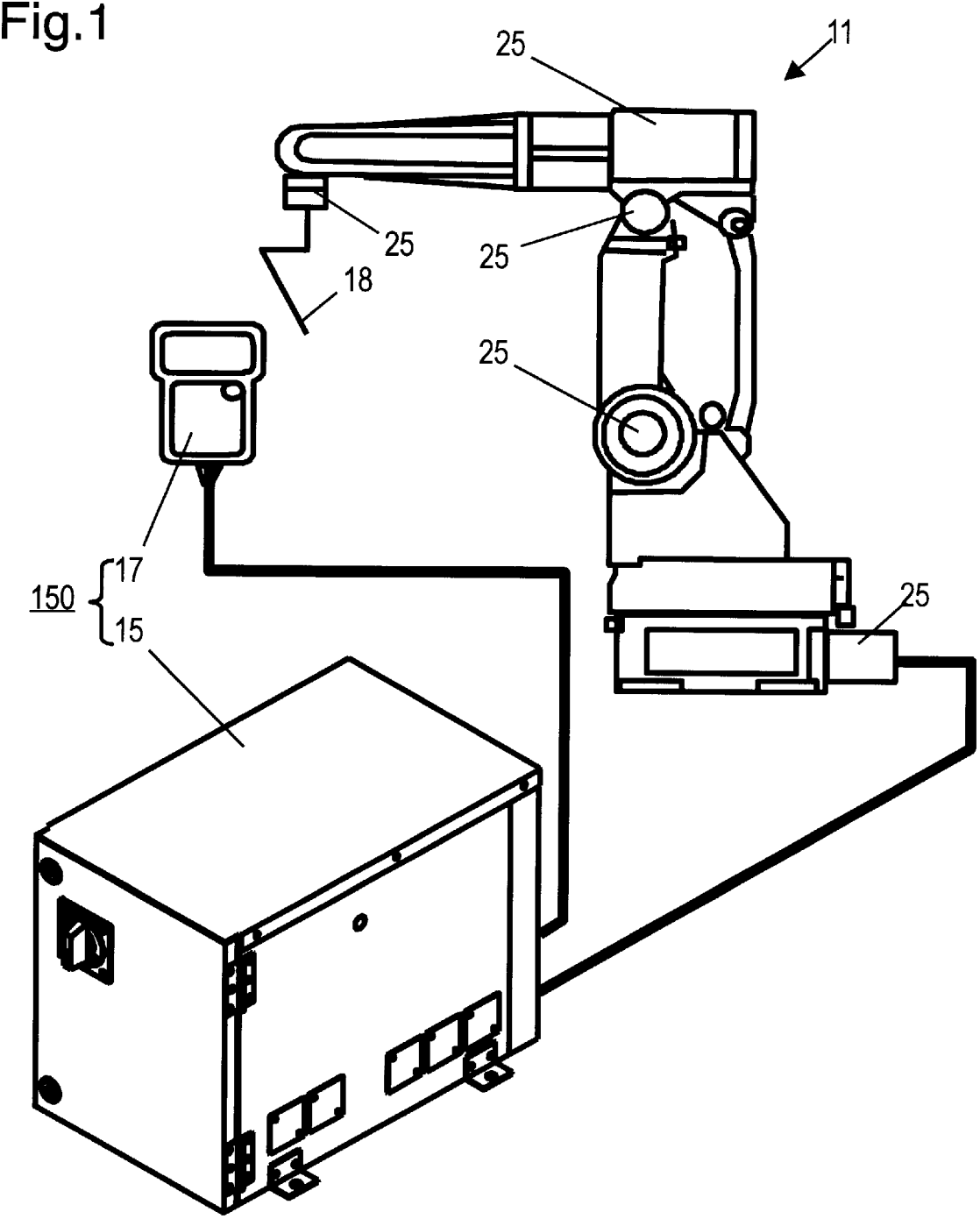
FIG. 1 is a diagram showing an RS having a robot control apparatus of the invention.

Referring now to the drawings, preferred embodiments of the invention are described in detail below.

Embodiment 1

Figure 2:
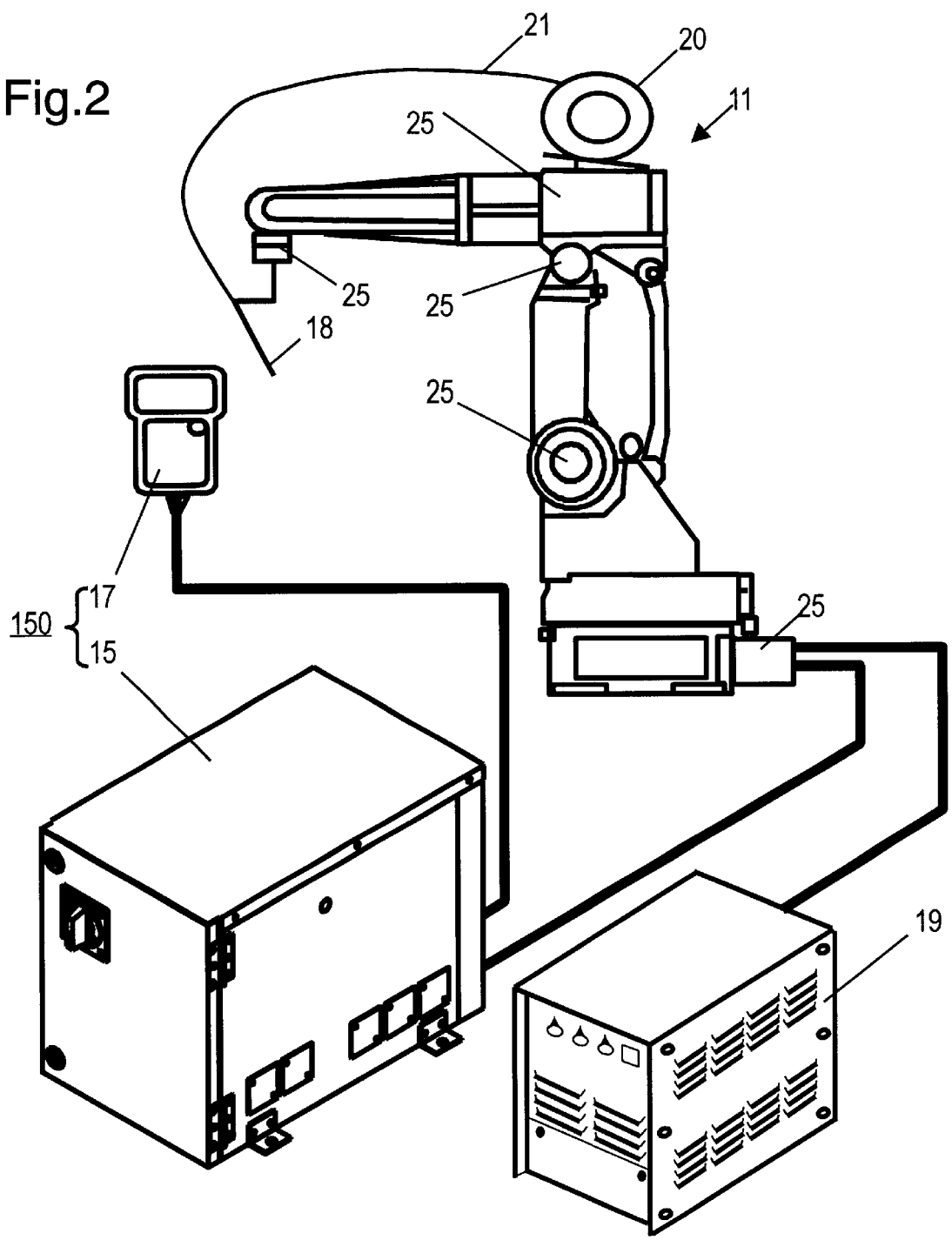
FIG. 2 is a diagram showing a welding RS having the robot control apparatus of the invention.
Figure 3A:
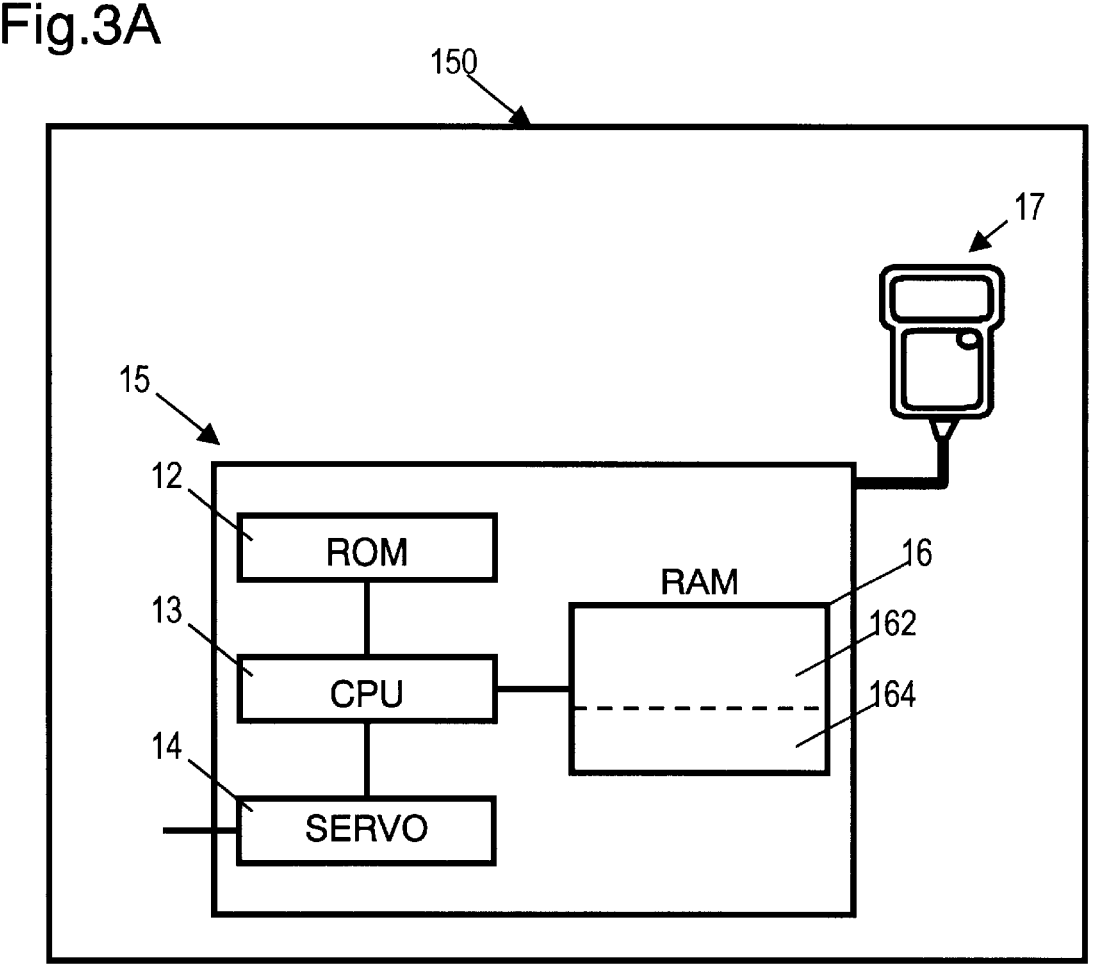
FIG. 3A is a block diagram of the robot control apparatus of the invention.
Figure 3B:
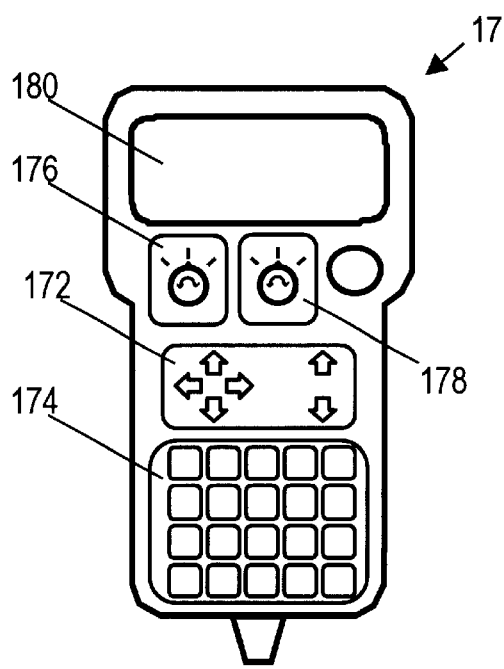
FIG. 3B is a diagram showing the detail of the input unit shown in FIG. 3A.
Figure 4:
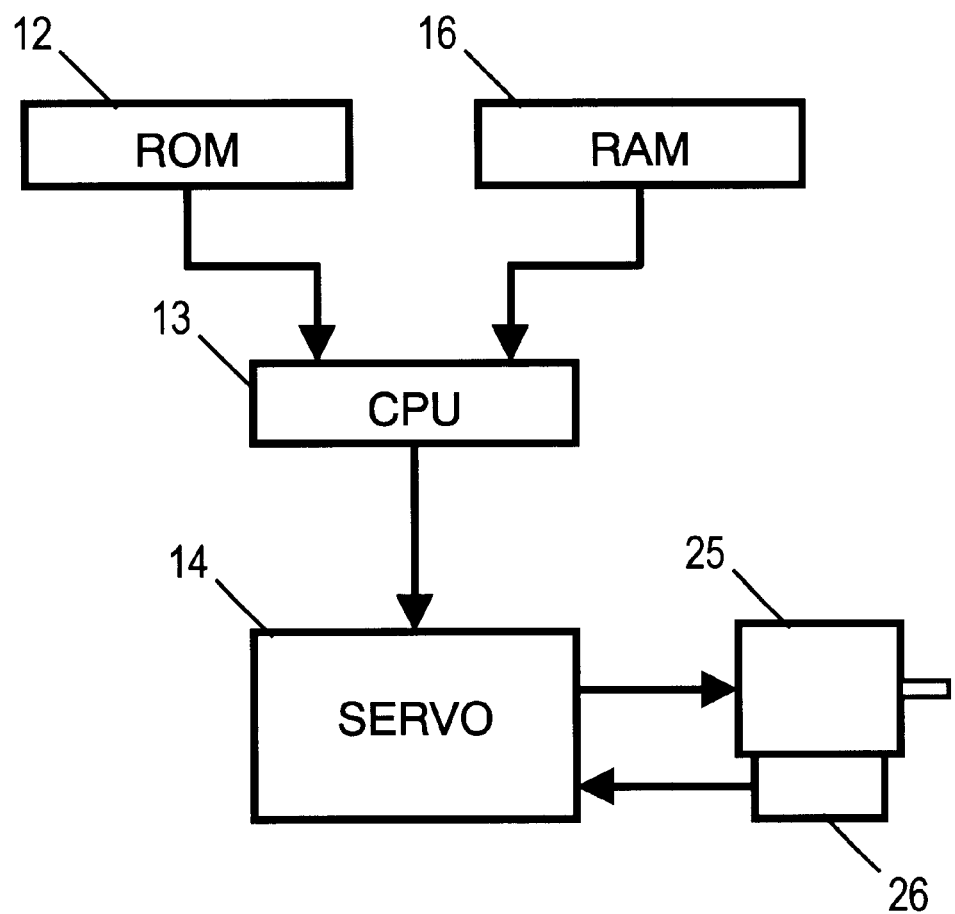
FIG. 4 is a processing flowchart of the robot control apparatus of the invention.

FIG. 1 is a schematic diagram of an RS using a robot control apparatus in embodiment 1. FIG. 2 is a schematic diagram showing a welding RS using the robot control apparatus in embodiment 1. FIG. 3A is a block diagram of the robot control apparatus of the invention. FIG. 3B is a diagram showing the detail of the input unit shown in FIG. 3A. FIG. 4 is flowchart of the robot control apparatus of the invention.

The RS comprises an RM 11, and a robot control apparatus 150 in embodiment 1 for controlling the RM 11. A welding RS includes a welding power supply unit 19 in addition to the RS.

The RM 11 includes motors 25 for driving each axis of the RM, and a tool 18 attached to the final leading end axis. Each motor 25 has an encoder 26. In the case of the RM 11 for the welding RS, a wire 21 is supplied to the tool 18 from a wire feeder 20. The wire feeder 20 is mounted on the RM 11.

The robot control apparatus 150 for controlling the operation of the RM 11 in embodiment 1 comprises:

a. an input unit 17 for operating the RM 11, and entering teaching data such as positions (teaching points) of the RM 11 and operation instructions as the RS, and b. a control unit 15 connected to the input unit.

The control unit 15 connected to the input unit 17 comprises:

a. a read-only memory (ROM) 12 storing a processing program for controlling the RM 11, b. a random access memory (RAM) 16 for storing the teaching data entered from the input unit, c. a CPU 13 for reading out necessary data from the RAM 16 and ROM 12, and instructing an operation to the RM 11, and d. a servo 14 for generating a signal for controlling the motor of the RM 11 according to the operation instruction from the CPU 13, and transmitting the signal to the motor.

The RAM 16, the storage unit, has a data region 162 for storing the teaching data entered from the input unit 17, and a vacant region 164 in which data is not stored. To hold the data in the storage unit RAM 16, a backup battery (not shown) is prepared.

The input unit 17 comprises:

an operation unit 172 for operating the RM for teaching, an input key pad 174 for entering various teaching data, a mode changeover unit 176 for changing over modes, a coordinates changeover unit 178 for changing over systems of coordinates, and a display unit 180 for displaying teaching data, etc.

The processing program creates a teaching program for operating the RS by interpreting the teaching data taught through the input unit 17, such as the position (teaching point) of the RM and operation instruction as the RS. The created teaching program is stored in the data region 162 of the RAM 16 together with its program number.

The changeover unit 176 is for selecting three modes, that is, input mode, operation mode, and in-process correction mode. In the input mode, the operator enters teaching data. In the operation mode, the RS operates according to the teaching program created on the basis of the teaching data. In the in-process correction mode, the operator can correct the teaching data stored in the storage unit during operation of the RS through the input unit 17.

The operation of the RM 11 having these devices is explained below while referring to FIG. 4.

The CPU 13;

reads out teaching data from the RAM 16, reads out a processing program from the ROM 12, and executes the above processing program, creates a motion track of the RM 11 based on the teaching data, and sends an operation instruction to the servo 14 based on the created motion track.

Next, the servo 14 transmits a motor control signal to the motor 25 of the RM 11 according to the operation instruction commanded from the CPU 13. Based on this motor control signal the motor 25 rotates, and the RM 11 is operated. The rotating speed of the motor 25 and the position information during rotation are fed back to the servo 14 by the encoder 26 attached to the motor 25. Based on the position information thus being fed back, the servo 14 controls the motor control signal.

Figure 5A:
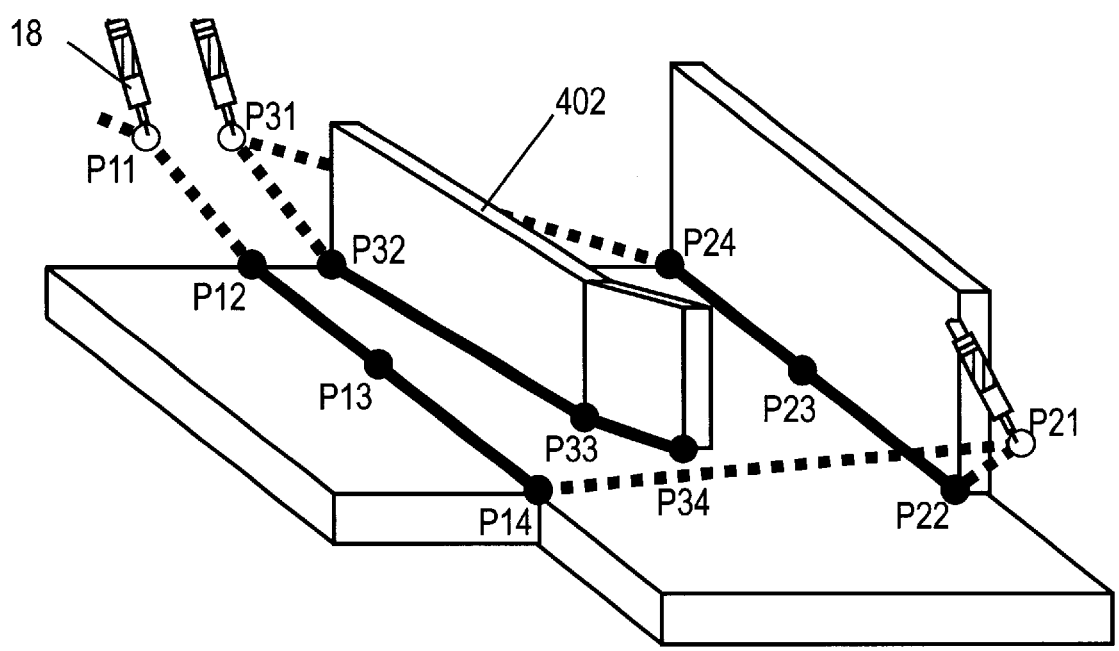
FIG. 5A is a diagram schematically showing a welding line as an example of welding by the RS having the robot control apparatus.

An example of welding a workpiece as shown in FIG. 5A is explained below.

When welding such a workpiece as shown in FIG. 5A, the operator sets the changeover unit 176 of the input unit 17 in the input mode, and the RM 11 is operated by the operation unit 172 of the input unit 17, and the welding operation is taught. The welding operation to be taught includes the position, stance and moving speed of the RM 11 and on/off switching of torch switch of the welding power supply unit 19. The operator can enter the teaching data while confirming the display content shown in the display unit 180. The taught welding operation is stored in the data region 162 of the RAM 16 as teaching data. From the teaching data, a teaching program is compiled by the processing program stored in the ROM 12. The teaching program is stored in the data region 162 of the RAM 16 together with its program number.

For example, the operator teaches:

1. coordinates of a first free-run point P11 before welding operation of the tool 18 of the RM 11, 2. coordinates of welding start point P12, and moving speed from free-run point P11 to welding start point P12, 3. start (ON) of operation of welding power supply unit at welding start point P12, and moving speed to specified point (P14), 4. coordinates of welding middle point P13 at passing position at specified speed while welding, 5. coordinates of welding end point P14, and 6. end (OFF) of welding power supply unit at welding end point P14.

Herein, the track passing through the welding start point P12, welding middle point P13, and welding end point P14 is called a first welding line. The teaching data is identified with teaching data numbers in the sequence of operation of the RS. Items 1 to 6 above correspond to the given teaching data numbers.

Thereafter, a second welding line (P22, P23, P24) is taught from a second free-run point P21, and a third welding line (P32, P33, P34) is taught from a third free-run point P31.

The teaching program obtained from the teaching data is stored in the data region 162 of the RAM 16 together with the program number.

The operator, after the teaching program is created, sets the changeover unit 176 of the input unit 17 in the operation mode, and instructs operation of the RS. By this instruction, the RS executes the teaching program.

Suppose the RS is operating this teaching program.

Herein, the operator is instructing to weld block 402 shown in FIG. 5A. Supposing the actual position of block 402' to be the position indicated by broken line in FIG. 5B, the teaching coordinates of P33 shown in FIG. 5A must be corrected to the position of P33' shown in FIG. 5B.

Figure 6:
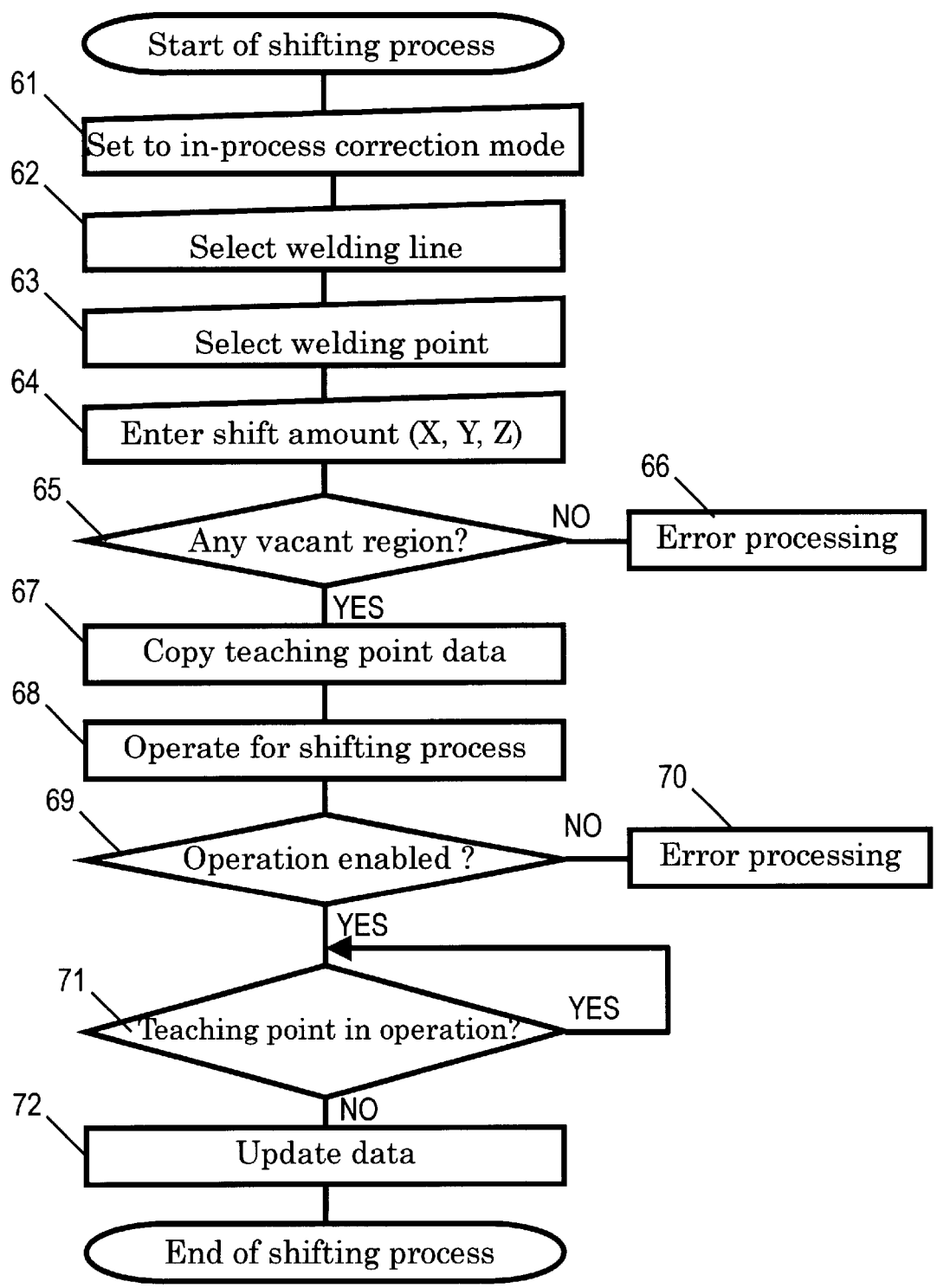
FIG. 6 is a flowchart for realizing the invention.

The RS having the robot control apparatus of the invention has an in process correction mode for correcting the coordinates of teaching points during RS operation. FIG. 6 shows a flow of shift processing for correcting the coordinates of teaching points during RS operation. Herein, shift processing is the process for correcting teaching data during RS operation in the in-process correction mode.

Referring to FIG. 6, the shift processing for correcting the coordinates of teaching points is explained below.

Step 61: The mode changeover unit 176 of the input unit 17 is set to the in-process correction mode.

Step 62: The operator selects a welding line to be corrected.

Step 63: The operator selects a teaching data number of the welding point to be corrected of the selected welding line.

Step 64: The operator enters the shifting distance of the position of teaching coordinates in X, Y, Z directions, and executes the shift processing.

Step 65: When the shift processing is executed at step 64, the processing program stored in the ROM 12 checks if the temporary region for copying the selected teaching data is present in a vacant region 164 in the RAM 16 or not.

Step 66: If a sufficient temporary region is not present in a vacant region 164 at step 65, an error message is displayed in the display unit of the input unit 17, and the processing is suspended.

Step 67: If a sufficient temporary region is present in a vacant region 164 at step 65, the processing program stored in the ROM 12 copies the data at the teaching point selected at step 63 in the temporary region of the RAM 16.

Step 68: The processing program stored in the ROM 12 operates for shift processing of teaching point. The position data after operation is written over the data copied in the temporary region of the RAM 16. However, the data in the data region of the RAM 16 is not written over yet at this moment.

Step 69: The processing program stored in the ROM 12 checks whether the position data after operation for shift processing is within the operation range of the RM and is available for operation or not.

Step 70: When there is an abnormality in the position data after operation for shift processing at step 69, the processing program judges if it is an error. If it is judged as an error, the processing program stored in the ROM 12 displays an error message, and suspends the processing.

Step 71: If the position data after shift operation is within operation range at step 69, it is checked whether the teaching point to be shifted is in operation or not. When the teaching point to be shifted is in operation, if the teaching point in operation is written over, the robot may operate according to imperfect data during overwrite, and may act abnormally. To prevent this, the processing program stored in the ROM 12 checks if the teaching point to be shifted is in operation or not.

While the RM is operating the teaching point to be shifted, it is designed to wait the data update processing for writing the data in the temporary region over the data in the data region 162 until the RM terminates the operation of this teaching point.

Step 72: When the teaching point to be shifted is not in operation, the processing program updates the data in the temporary region of the RAM 16 by copying to the data region 162 of the RAM 16.

When the RM terminates the operation of the teaching point to be shifted, the processing program stored in the ROM 12 immediately updates data.

By this updating process, the position correction of the teaching point is complete.

If the shift processing is suspended at step 66 or step 70, the processing of the workpiece is not suspended but the operation continues.

The passing process of the tool 18 of the RM 11 through the teaching points explained in FIG. 6 is described below by referring to FIGS. 7A, 7B, 7C.

Figure 5B:
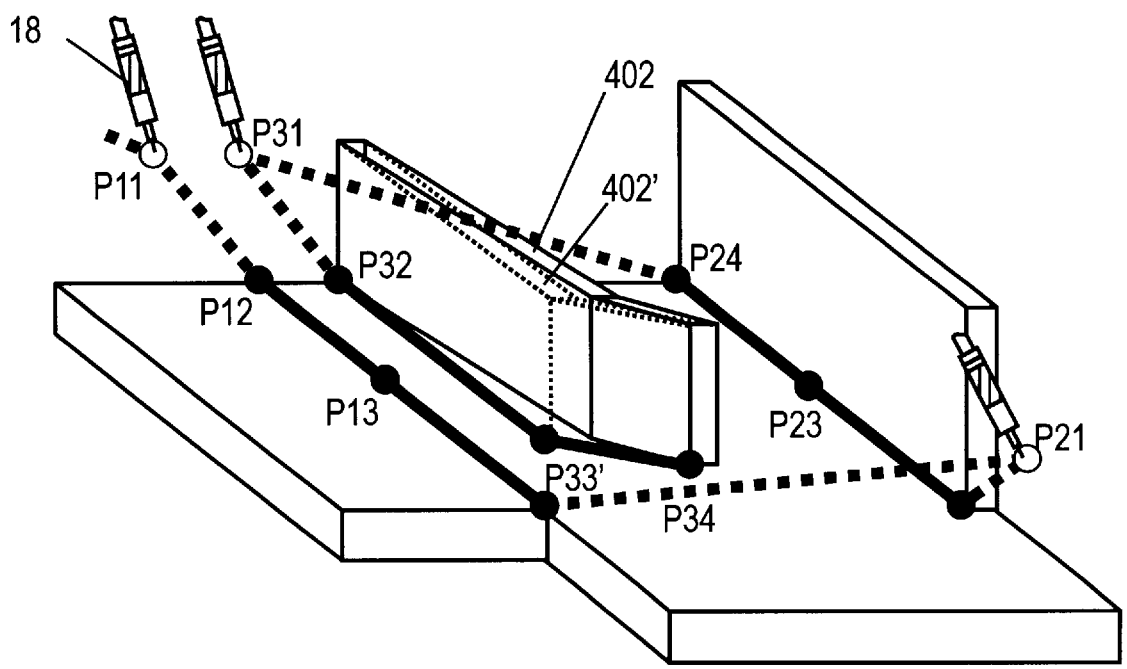
FIG. 5B is a diagram schematically showing an example of correction of position of welding points in FIG. 5A.
Figure 7A:
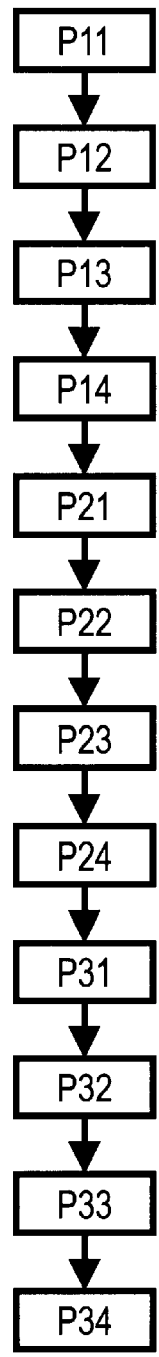
FIG. 7A shows the passing sequence of teaching points shown in FIG. 5A
Figure 7B:
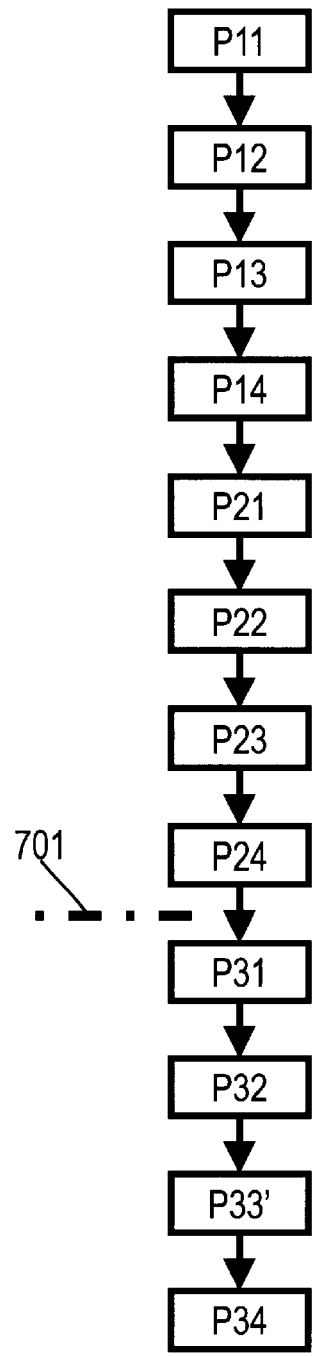
FIG. 7B shows the passing sequence of teaching points when the teaching point to be corrected is corrected before operating the teaching point to be corrected shown in FIG. 5B.
Figure 7C:
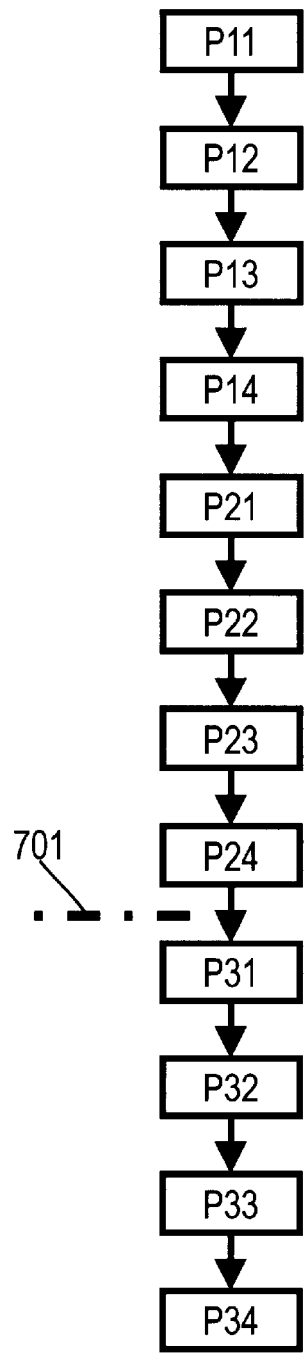
FIG. 7C shows the passing sequence of teaching points when correcting and teaching during operation of the teaching point to be corrected shown in FIG. 5B.

FIG. 7A shows the passing order of teaching points taught by the operator as shown in FIG. 5A. In this state, as shown in FIG. 5B, P33 is corrected to P33'. When the tool 18 of the RM 11 finishes correction of the teaching point by the passing position of the line 701 shown in FIG. 7B, the tool 18 of the RM 11 passes the corrected teaching point (P33). However, if the tool 18 of the RM 11 does not finish correction of the teaching point by the passing position of the line 701 shown in FIG. 7B, the tool 18 of the RM 11 passes the uncorrected teaching point (P33). FIG. 7B shows the passing order of teaching points when the teaching points to be corrected are corrected before operating at such points shown in FIG. 5B. FIG. 7C shows the passing order of teaching points when correcting and teaching of the teaching points to be corrected shown in FIG. 5 B are done during operation The workpiece currently under process is processed as shown in FIG. 7C. However, the workpiece to be processed next is processed when it passes the corrected teaching point shown in FIG. 7B.

During a series of such process, the shifting process can be executed without stopping the operation of the RS.

While the RM is operated at the teaching point to be shifted, data updating is kept in waiting state. By this process, even in the teaching program executed at the present, the shift processing is enabled.

Hitherto, in order to correct position of teaching points, the RS must stop the continuous operation temporarily, and correct the teaching points. By this invention, the position of the teaching point can be corrected without stopping continuous operation of the RS, so that the position of the teaching point can be corrected efficiently without lowering the productivity of the production line.

Embodiment 2

A robot control apparatus 150 in a second embodiment relates to a welding RS.

The robot control apparatus 150 in the second embodiment is basically the same in structure as the RS in the first embodiment.

In the welding RS shown in FIG. 2, fine adjustment of welding line position is done frequently. In this case, shifting process for fine adjustment of welding line position is done frequently.

When shifting process is needed in the welding RS, the operator sets the mode changeover unit 176 of the input unit 17 to the in-process correction mode. By this setting, a list of welding lines is automatically shown in the display unit 180 of the input unit 17.

Figure 8A:
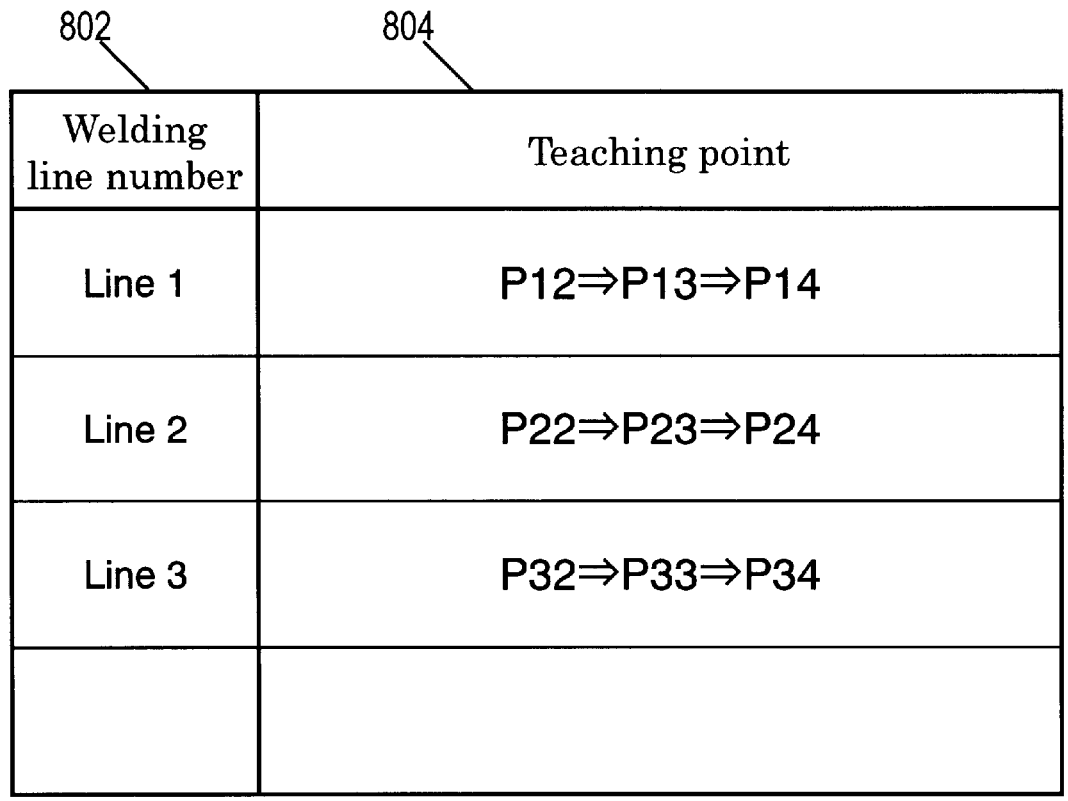
FIG. 8A is a diagram showing an example of a list of welding lines.
Figure 8B:
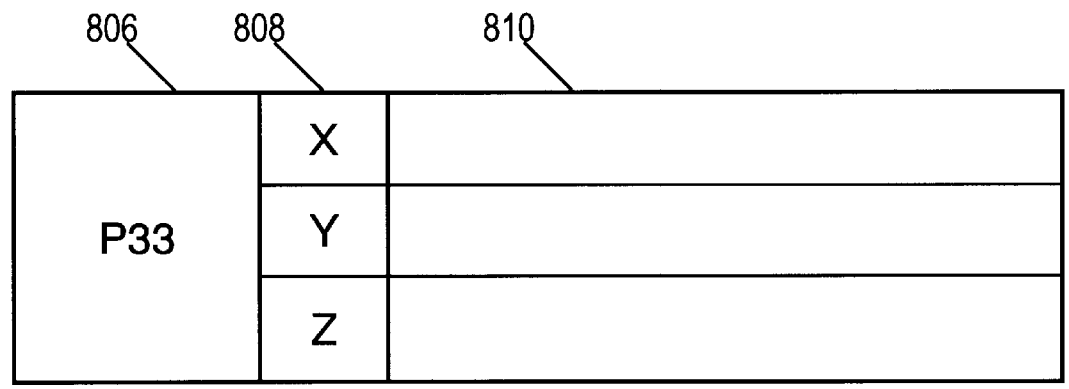
FIG. 8B is a diagram showing an example of coordinates of one welding point in FIG. 5A.

For example, when the operator sets the mode changeover unit 176 to the in-process correction mode, as shown in FIG. 8A, a list of welding lines is shown in the display unit 180 of the input unit 17. From the list of welding lines being displayed, the operator selects a corresponding welding line, and further selects a welding point from the selected welding line. In FIG. 8A, a number display unit 802 shows the number of the welding line, and a teaching point display unit 804 shows the corresponding teaching point of the welding line. Also from the list of the welding lines in FIG. 8A, when a teaching point required to be corrected is selected, as shown in FIG. 8B, the teaching point number is displayed in a number column 806, and axes X, Y and Z are displayed in a coordinate axis column 808. A coordinate column 810 is vacant. When the table shown in FIG. 8B is displayed, the operator enters the numerical value to be shifted in specified coordinates by means of the input keys 174.

Thus, in the in-process correction mode, a setting function is provided for limiting in a specific range from taught multiple teaching points that can be corrected.

Figure 9:
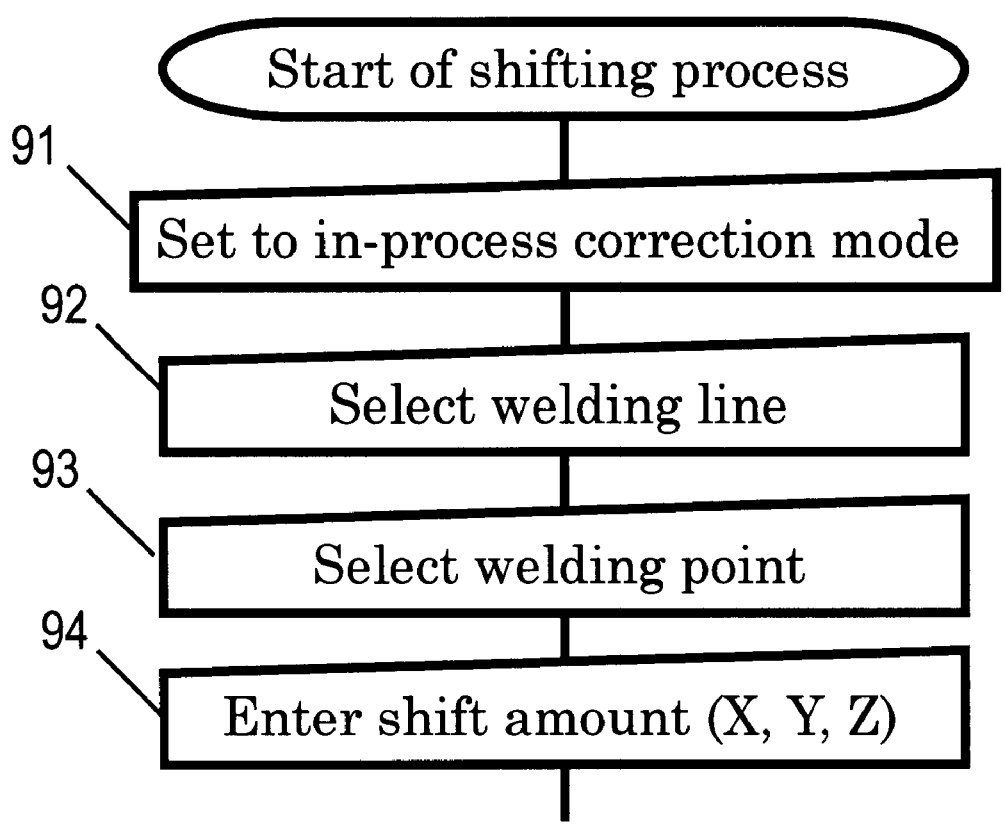
FIG. 9 is a flowchart for realizing selection of welding line and selection of welding point of the invention.

FIG. 9 is a flowchart of shifting process of fine adjustment of welding line position in the case that the teaching program is a welding program.

Step 91: The mode changeover unit 176 of the input unit 17 is set to the in-process correction mode. By this setting, the range from welding start point to welding end point is searched as one welding line, and a list of welding lines is displayed in the display unit 180 of the input unit 17 (see FIG. 8A).

Step 92: The operator selects the welding line for shifting process from the list of welding lines displayed.

Step 93: The operator selects the welding point for shifting process from the selected welding line. By this selection, the coordinates for shifting process are shown as in FIG. 8B.

Step 94: When FIG. 8B is displayed, the operator enters the amount of the shift in the vacant column of the coordinates to be corrected.

The subsequent process is the same as explained at step 65 and after in the first embodiment shown in FIG. 6.

By displaying the list of welding lines, the operator can easily specify the welding lines which require corrections. Further, in the list of welding lines, by displaying teaching points of each welding line, the operator can easily search the teaching points which require corrections. By this search, the operator easily selects the teaching point for executing shifting process. Thus, the input unit 17 comprises means for displaying to specify the teaching points that can be corrected, selecting the teaching point to be corrected, and correcting and setting the selected teaching point, so that the correction is done easily.

The robot control apparatus of the invention comprises one of the following systems of coordinates X, Y, Z for shifting the welding point:

an absolute system of coordinates based on a preset machine origin of the RM, a tool system of coordinates based on the tool (hand) attached to the final leading end of the RM, and a user system of coordinates arbitrarily set by the user.

In this case, between step 93 and step 94 in the flowchart in FIG. 9, the system of coordinates for shifting the welding point is selected. The operator sets the coordinate changeover unit 178 of the input unit 17, selects an appropriate system of coordinates from three systems of coordinates given above, and determines the X, Y, Z direction in the shifting process. As a result, the operator can correct the teaching point to the desired position.

Thus, according to the invention, by changing over to the in-process correction mode, the position of teaching point of the RM can be corrected during continuous operation of the RS. It hence realizes an excellent robot control apparatus capable of correcting the position of teaching point without causing effects on the productivity of the production line.

When the RM attempts to correct the teaching point in operation, it waits until the operation is over and process correction after that, so that it realizes an excellent robot control apparatus capable of preventing operation of the RM with imperfect data in the midst of correction.

Further, by the display unit of list of welding lines, for example, when correcting only the welding teaching point, the operator can select the teaching point to be corrected more easily, so that an excellent robot control apparatus may be realized.

Moreover, by preparing three systems of coordinates as the directions of the axes of coordinates when correcting the teaching point, an appropriate system of coordinates is selected and the correction direction of teaching point can be determined, so that an excellent robot control apparatus capable of selecting the system of coordinates depending on the work shape and other conditions may be realized.

A robot manipulator of a robot system incorporating the robot control apparatus of the invention is presented as an example of multi-joint robot. However, the robot of the robot system using the robot control apparatus of the invention may be also realized by an orthogonal robot.

The robot control apparatus of the invention is explained in the example of welding. However, the robot control apparatus of the invention may be, for example, also applied in an object conveying system by replacing the tool 18 attached to the final leading end of the robot manipulator with a robot hand for gripping and releasing an object.

The robot control apparatus of the invention is also applied in a painting system by replacing the tool 18 attached to the final leading end of the robot manipulator with a painting nozzle, and the welding power supply unit 19 with a painting power supply unit.

The robot control apparatus of the invention is also applied in a robot laser processing machine by replacing the welding power supply unit 19 with a laser oscillator, and the tool 18 attached to the final leading end of the robot manipulator with a focusing unit incorporating a laser beam focusing lens.

Industrial Applicability

According to the invention, the operator, by changing over to the in process correction mode, can correct the position of the operation point of the robot during continuous operation of the robot. Therefore, it realizes an excellent robot control apparatus capable of correcting the position of operation point without causing effects on the productivity of the production line.

When the robot attempts to correct the operation point in operation, waiting until the operation is over, correction is processed after operation. Therefore, it realizes an excellent robot control apparatus capable of preventing operation of the robot with imperfect data in the midst of correction.

Further, by using the setting means for limiting the operation points that can be corrected, for example, when correcting only the welding operation point, the operator can select the operation point to be corrected more easily, so that an excellent robot control apparatus may be realized.

Moreover, the setting means for selecting the direction of the axis of coordinates when correcting the operation point from arbitrary systems of coordinates and determining the correction direction of operation point is provided. Therefore, it realizes an excellent robot control apparatus capable of selecting the system of coordinates depending on the work shape and other conditions.

What is claimed is:

1. A robot control apparatus including an input unit and a control unit comprising:

a storage unit for storing data of teaching points entered from said input unit; and a changeover unit provided in said input unit for changing over modes by selecting from an input mode for entering data of teaching points, an operation mode for operating the robot manipulator according to the entered data of teaching points, and an in-process correction mode for correcting the data of teaching points stored in said storage unit according to the data from said input unit during operation of the robot manipulator, wherein said input unit for entering teaching points of a robot manipulator is connected said control unit, and wherein said control unit transmits data for operating the robot manipulator to a drive unit of the robot manipulator according to the data of teaching points stored in said storage unit.

2. The robot control apparatus of claim 1, wherein, in the in-process correction mode, only the teaching points not put in operation yet can be corrected, and teaching points during operation are corrected after completion of operation.

3. The robot control apparatus of claim 2, further comprising:

a display unit for specifying the teaching points that can be corrected, in the in-process correction mode, and means for selecting the teaching points to be corrected therefrom, and correcting and setting the selected teaching points.

4. The robot control apparatus of claim 2, further comprising setting means for determining the correction direction of the teaching point by selecting the system of coordinates, in the in-process correction mode, from an absolute system of coordinates on the basis of a preset machine origin of the RM (robot manipulator), a tool system of coordinates on the basis of the tool attached to the final leading end of the RM (robot manipulator), and a user system of coordinates arbitrarily set by the user.

5. The robot control apparatus of claim 1, further comprising:

a display unit for specifying the teaching points that can be corrected, in the in-process correction mode, and means for selecting the teaching points to be corrected therefrom, and correcting and setting the selected teaching points.

6. The robot control apparatus of claim 5, further comprising setting means for determining the correction direction of the teaching point by selecting the system of coordinates, in the in-process correction mode, from an absolute system of coordinates on the basis of a preset machine origin of the RM (robot manipulator), a tool system of coordinates on the basis of the tool (hand) attached to the final leading end of the RM (robot manipulator), and a user system of coordinates arbitrarily set by the user.

7. The robot control apparatus of claim 1, further comprising setting means for determining the correction direction of the teaching point by selecting the system of coordinates, in the in-process correction mode, from an absolute system of coordinates on the basis of a preset machine origin of the RM (robot manipulator), a tool system of coordinates on the basis of the tool attached to the final leading end of the RM (robot manipulator), and a user system of coordinates arbitrarily set by the user.

* * * * *